United States Patent
Ito et al.

(10) Patent No.: US 8,324,579 B2
(45) Date of Patent: Dec. 4, 2012

(54) ARTICLE CARRYING-OUT MONITOR

(75) Inventors: Katsuhito Ito, Fuchu (JP); Ryohei Yanagishima, Oume (JP)

(73) Assignee: Fuji Electric Co., Ltd. (JP)

( * ) Notice: Subject to any disclaimer, the term of this patent is extended or adjusted under 35 U.S.C. 154(b) by 875 days.

(21) Appl. No.: 12/427,680

(22) Filed: Apr. 21, 2009

(65) Prior Publication Data

US 2010/0264317 A1   Oct. 21, 2010

(51) Int. Cl.
*G01N 23/00* (2006.01)
(52) U.S. Cl. ............... 250/360.1; 250/359.1; 250/358.1; 250/356.2; 378/57
(58) Field of Classification Search ............... 250/360.1, 250/359.1, 358.1, 356.2; 378/57
See application file for complete search history.

(56) References Cited

U.S. PATENT DOCUMENTS

| | | | |
|---|---|---|---|
| 3,564,247 A * | 2/1971 | Packer | 378/54 |
| 4,866,277 A * | 9/1989 | Johnson et al. | 250/385.1 |
| 5,135,706 A * | 8/1992 | Costes et al. | 376/245 |
| 5,444,746 A * | 8/1995 | Okamoto et al. | 376/245 |
| 6,624,415 B1 * | 9/2003 | Hattori et al. | 250/336.1 |
| 7,072,440 B2 * | 7/2006 | Mario et al. | 378/57 |
| 2010/0163734 A1 * | 7/2010 | Proctor et al. | 250/359.1 |

FOREIGN PATENT DOCUMENTS

| | | |
|---|---|---|
| JP | 6-174852 A | 6/1994 |
| JP | 3475633 A | 9/2003 |
| JP | 2009-8555 A | 1/2009 |

OTHER PUBLICATIONS

Translation of JP2009-008555.*
Translation of JP2007-171023.*

* cited by examiner

*Primary Examiner* — David Porta
*Assistant Examiner* — Djura Malevic
(74) *Attorney, Agent, or Firm* — Rossi, Kimms & McDowell LLP (57) ABSTRACT

A monitor part performs monitoring by detecting contamination on a lower surface of an article to be inspected based on a lower surface detection signal, detecting contamination on an upper surface of the article based on an upper surface detection signal, detecting contamination on a front surface of the article based on a front, lower surface detection signal and a front, upper surface detection signal, detecting contamination on a rear surface of the article based on a rear, lower surface detection signal and a rear, upper surface detection signal, detecting contamination on a left surface of the article based on a left, lower surface detection signal and a left, upper surface detection signal, and detecting contamination on a right surface of the article based on a right, lower surface detection signal and a right, upper surface detection signal.

5 Claims, 9 Drawing Sheets

FIG. 1

100 ARTICLE CARRYING-OUT MONITOR

FIG. 2

2 CONVEYANCE PART

FIG. 3

2 CONVEYANCE PART

ARTICLE CARRYING-OUT MONITOR

BACKGROUND

The present invention relates to an article carrying-out monitor that inspects the presence of contamination (radioactive contamination), by radioactive substances, on an article, which is a subject of inspection carried out into a non-controlled area from a controlled area of a facility, in which radioactive substances are handled, such as an atomic power plant, etc.

As a conventional technology related to an article carrying-out monitor for an article to be inspected, article carrying-out monitors, for which a small article is especially a subject of inspection, are known as described in, for example, Japanese Patent No. 3475633 (Title of the Invention: Small article monitor) and JP-A-6-174852 (Title of the Invention: Small article carrying-out monitor apparatus). A small article is an article, such as tool, measuring instrument, document, notebook, etc., which is carried out into a non-controlled area by a person leaving a controlled area of radiation.

The small article monitor described in Japanese Patent No. 3475633 includes detectors in all six, that is, front and rear, left and right, and upper and lower directions as viewed in a running direction in a monitor chamber. Front and rear detection parts are mounted inside, for example, an inlet door and an outlet door so as to be capable of elevation as a small article 1 advances. Also, an upper surface detection part is positioned in a vertical direction according to height of a small article so as to enable assuming an appropriate sensitivity and the presence of contamination is detected after positioning is made.

The small article carrying-out monitor apparatus described in JP-A-6-174852 includes detectors in all six, that is, front and rear, left and right, and upper and lower directions as viewed in a running direction in a monitor chamber and is arranged in the monitor chamber such that a small article is moved up and down from under as shown in FIG. 9 of JP-A-6-174852.

As described above, a small article is an article, such as tool, measuring instrument, document, notebook, etc., which is not fixed in size and shape. With the conventional technology described in Japanese Patent No. 3475633, since positioning in a vertical direction is done so as to provide for an optimum position according to a height of a small article, contamination is surely detected in the case where contamination is present on an upper surface or a lower surface of the small article, but there is a fear that a weak radiation cannot be detected because of no positional adjustment on front and rear, and left and right surfaces. Such problem is likewise involved in the conventional technology described in JP-A-6-174852.

As radiation control becomes stricter (control in conformity to the control criteria of 0.8 Bq/cm$^2$ for Co-60) in the future, there is a need of surely detecting radioactive surface contamination on all surfaces of a subject of inspection.

Also, there is a demand for a further improvement in sensitivity of radiation detection by means of lowering of the limit of detection. Generally, there is a need of reducing influences by background noise in order to achieve an improvement in detection sensitivity. Further, there is a demand for elimination of an erroneous determination that a small article, to which natural, nuclear species adhere widely and thinly and which is not contaminated, is determined to be "contaminated".

In view of the above, it would be desirable to provide an article carrying-out monitor that eliminates influences by a shape of an article, which is a subject of inspection, as far as possible and improves detection of six surfaces of the article, which is a subject of inspection, in sensitivity to enable favorably detect the presence of contamination.

SUMMARY OF THE INVENTION

The invention provides an article carrying-out monitor that eliminates influences by a shape of an article, which is a subject of inspection, as far as possible and improves detection of six surfaces of the article, which is a subject of inspection, in sensitivity to enable favorably detect the presence of contamination.

In order to solve such problem, the invention according to a first aspect provides an article carrying-out monitor comprising at least a monitor part including a radiation detector to perform monitoring of an article to be inspected, a carrying-in conveyor that carries a tray, on which an article to be inspected is put, into the monitor part, a carrying conveyor that conveys the tray in the monitor part, and a carrying-out conveyor that carries a tray, on which an article to be inspected is put, from the monitor part in order to inspect the presence of contamination, by radioactive substances, on an article, which is a subject of inspection carried out from a controlled area of a facility, in which radioactive substances are handled.

The detector in the monitor part includes a lower surface detector disposed below a path of conveyance of an article to be inspected, an upper surface detector disposed above the path of conveyance of an article to be inspected, a front, lower surface detector disposed forwardly of the lower surface detector, a front, upper surface detector disposed forwardly of the upper surface detector, a rear, lower surface detector disposed rearwardly of the lower surface detector, a rear, upper surface detector disposed rearwardly of the upper surface detector, a left, lower surface detector disposed leftward of the lower surface detector, a left, upper surface detector disposed leftward of the upper surface detector, a right, lower surface detector disposed rightward of the lower surface detector, and a right, upper surface detector disposed rightward of the upper surface detector.

The monitor part performs monitoring by means of detecting the presence of contamination on a lower surface of an article to be inspected on the basis of a lower surface detection signal from the lower surface detector, detecting the presence of contamination on an upper surface of an article to be inspected on the basis of an upper surface detection signal from the upper surface detector, detecting the presence of contamination on a front surface of an article to be inspected on the basis of a front, lower surface detection signal from the front, lower surface detector and a front, upper surface detection signal from the front, upper surface detector, detecting the presence of contamination on a rear surface of an article to be inspected on the basis of a rear, lower surface detection signal from the rear, lower surface detector and a rear, upper surface detection signal from the rear, upper surface detector, detecting the presence of contamination on a left surface of an article to be inspected on the basis of a left, lower surface detection signal from the left, lower surface detector and a left, upper surface detection signal from the left, upper surface detector, and detecting the presence of contamination on a right surface of an article to be inspected on the basis of a right, lower surface detection signal from the right, lower surface detector and a right, upper surface detection signal from the right, upper surface detector.

Also, the invention according to a second aspect adds to the article carrying-out monitor according to the first aspect a feature that the detector in the monitor part includes a lower detection part comprising lower divided sensors (i, j) arranged in a matrix configuration below a path of conveyance of an article to be inspected, which matrix comprises i (i=1 to m) columns in a direction substantially parallel to the path of conveyance and j (j=1 to n) rows in a direction substantially perpendicular to the path of conveyance, and an upper detection part comprising upper divided sensors (i, j) arranged in a matrix configuration above the path of conveyance of an article to be inspected, which matrix comprises i (i=1 to m) columns in a direction substantially parallel to the path of conveyance and j (j=1 to n) rows in a direction substantially perpendicular to the path of conveyance, and the monitor part performs monitoring for determination of the presence of contamination on an article to be inspected, selecting a detection signal, which has a large signal strength, among lower surface detection signals being (m−2)×(n−2) in number and output from the lower surface detector, which comprises lower divided sensors (i, j) being (m−2)×(n−2) in number with i=2 to (m−1) and j=2 to (n−1), upper surface detection signals being (m−2)×(n−2) in number and output from the upper surface detector, which comprises upper divided sensors (i, j) being (m−2)×(n−2) in number with i=2 to (m−1) and j=2 to (n−1), front, lower surface detection signals being (n−2) in number and output from the front, lower surface detector, which comprises lower divided sensors (i, j) being (n−2) in number with i=1 and j=2 to (n−1), front, upper surface detection signals being (n−2) in number and output from the front, upper surface detector, which comprises upper divided sensors (i, j) being (n−2) in number with i=1 and j=2 to (n−1), rear, lower surface detection signals being (n−2) in number and output from the rear, lower surface detector, which comprises lower divided sensors (i, j) being (n−2) in number with i=m and j=2 to (n−1), rear, upper surface detection signals being (n−2) in number and output from the rear, upper surface detector, which comprises upper divided sensors (i, j) being (n−2) in number with i=m and j=2 to (n−1), left, lower surface detection signals being (m−2) in number and output from the left, lower surface detector, which comprises lower divided sensors (i, j) being (m−2) in number with i=2 to (m−1) and j=1, left, upper surface detection signals being (m−2) in number and output from the left, upper surface detector, which comprises upper divided sensors (i, j) being (m−2) in number with i=2 to (m−1) and j=1, right, lower surface detection signals being (m−2) in number and output from the right, lower surface detector, which comprises lower divided sensors (i, j) being (m−2) in number with i=2 to (m−1) and j=n, and right, upper surface detection signals being (m−2) in number and output from the right, upper surface detector, which comprises upper divided sensors (i, j) being (m−2) in number with i=2 to (m−1) and j=n.

Also, the invention according to a third aspect adds to the article carrying-out monitor according to the second aspect a feature that the lower detection part is not formed with the lower divided sensor (1, 1), the lower divided sensor (m, 1), the lower divided sensor (1, n), and the lower divided sensor (m, n), and the upper detection part is not formed with the upper divided sensor (1, 1), the upper divided sensor (m, 1), the upper divided sensor (1, n), and the upper divided sensor (m, n).

Also, the invention according to a fourth aspect adds to the article carrying-out monitor according to the second and third aspects a feature that a positioning means or mechanism is provided so that both a vertical distance between the lower detection part and an article to be inspected and a vertical distance between an article to be inspected the upper detection part are made predetermined distances.

As described above, it is possible according to the invention to provide an article carrying-out monitor that eliminates influences by a shape of an article, which is a subject of inspection, as far as possible and improves detection of six surfaces of the article, which is a subject of inspection, in sensitivity to enable favorably detect the presence of contamination.

BRIEF DESCRIPTION OF THE DRAWINGS

The invention will be described with reference to certain preferred embodiments thereof and the accompanying drawings, wherein.

DETAILED DESCRIPTION OF THE PREFERRED EMBODIMENTS

Figure 1:
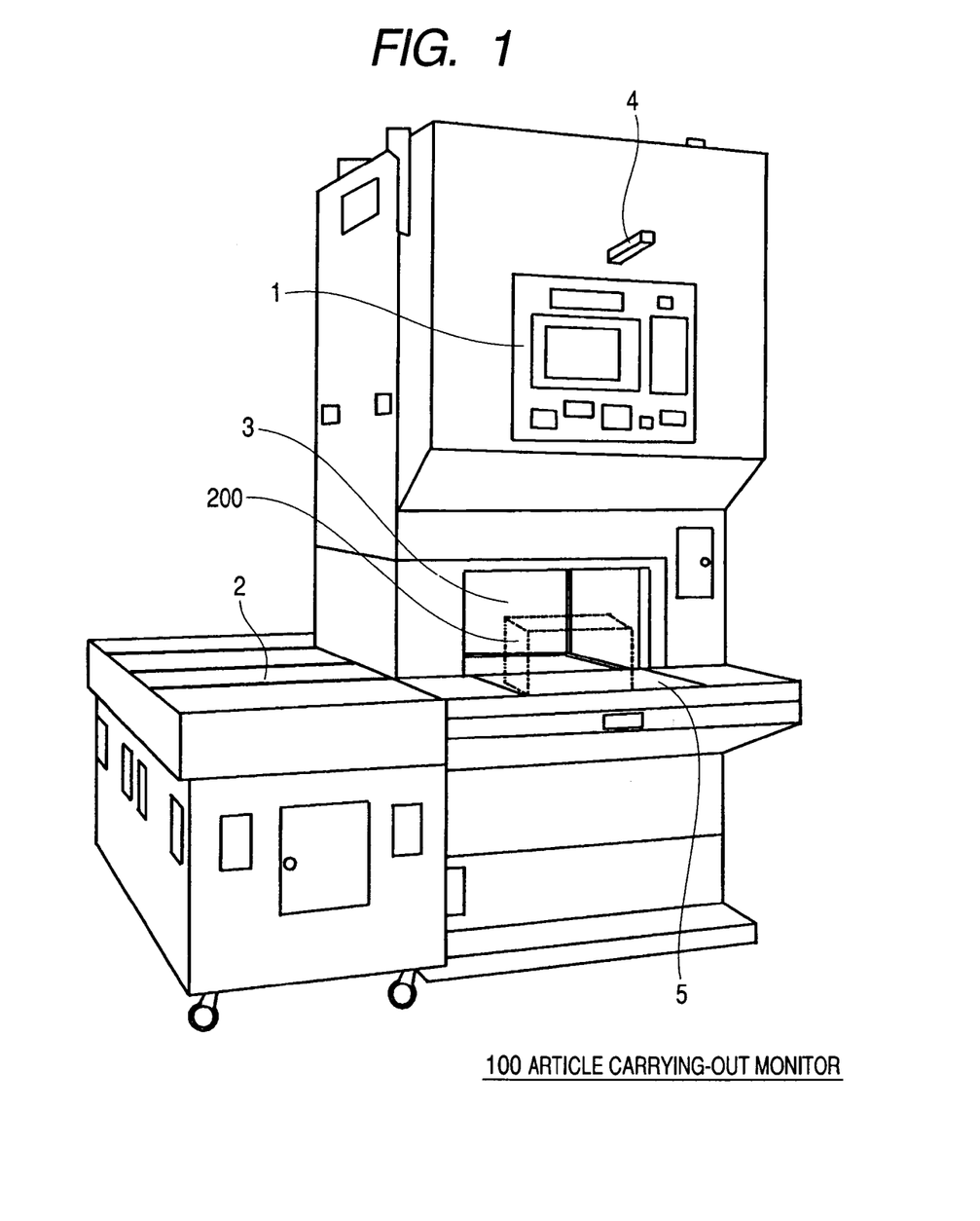
FIG. 1 is a view showing an outward appearance of an article carrying-out monitor according to a best mode for carrying out the invention.

Subsequently, a best mode for carrying out the invention will be described with reference to the drawings. FIG. 1 is a view showing an outward appearance of an article carrying-out monitor according to the present embodiment, FIGS. 2 and 3 are views illustrating conveyance of the article carrying-out monitor according to the embodiment, and FIG. 4 is a view illustrating a monitor part as viewed from a side.

As apparent from FIG. 1, the article carrying-out monitor 100 comprises an operation panel 1, a conveyance part 2, a monitor part 3, a height sensor 4, a control driving part (not shown). With the article carrying-out monitor 100, a small article 200 being a specific example of an article being inspected is put on a tray 5, a height sensor 4 measures a height of the small article 200 to beforehand determine a position of an upper detection part 34 (see FIG. 4, etc.) in a chamber of the monitor part 3, after the tray 5 is moved into the monitor part 3, the upper detection part 34 is lowered to an optimum position to monitor the small article 200, in the case where the small article 200 is not contaminated, the tray 5 moves to a non-controlled area from a controlled area of radiation to discharge the small article 200, after the small article 200 having been inspected is received in the non-controlled area, the tray 5 is returned to an original input location, and on the other hand, in the case where the small article 200 is contaminated, the tray 5 is returned to the controlled area of radiation. The tray 5 is automatically returned to save a person who leaves, time for returning the tray 5.

An explanation will be given to respective constituent parts. The operation panel 1 is arranged on an upper portion of an inlet side front face and provided with a color liquid crystal display and a speaker, which explain an operating procedure by means of a screen and voice, keys, by means of which a kind of and the number of the small articles 200, etc. are set and input, switches for starting (starting of measurement) for carrying-in, and the like. While not seen in FIG. 1, a similar operation panel is mounted on a back face side to display results of inspection and contents of abnormality together with an operation guide.

Figure 2:
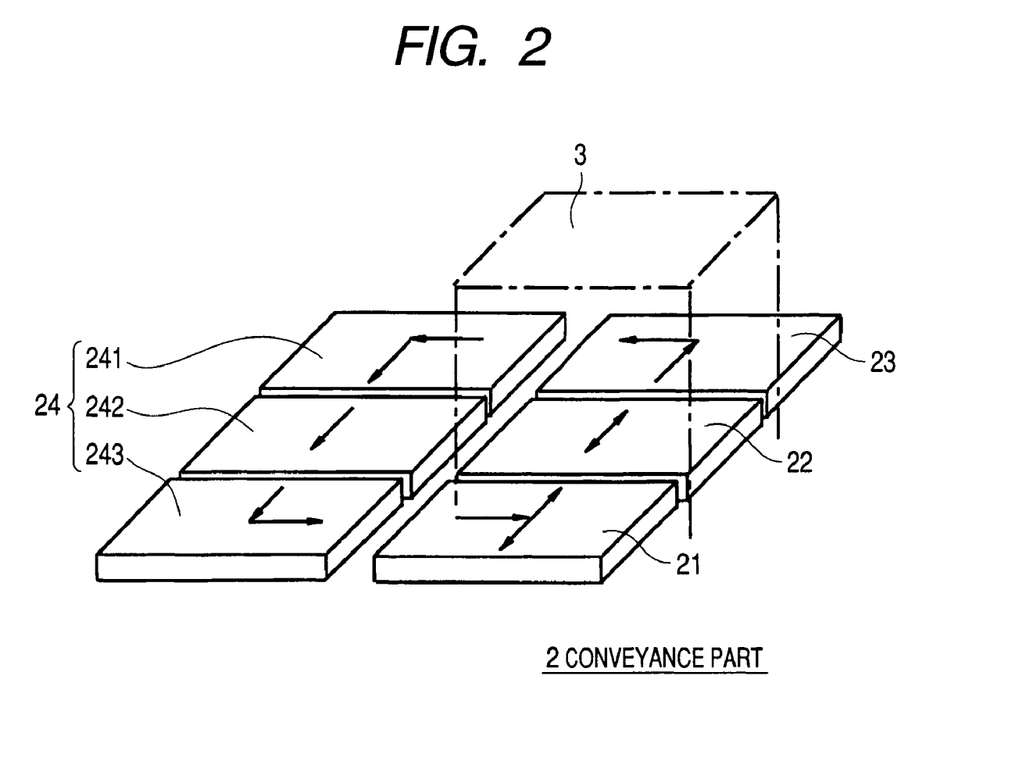
FIG. 2 is a view illustrating conveyance of the article carrying-out monitor according to the best mode for carrying out the invention.
Figure 3:
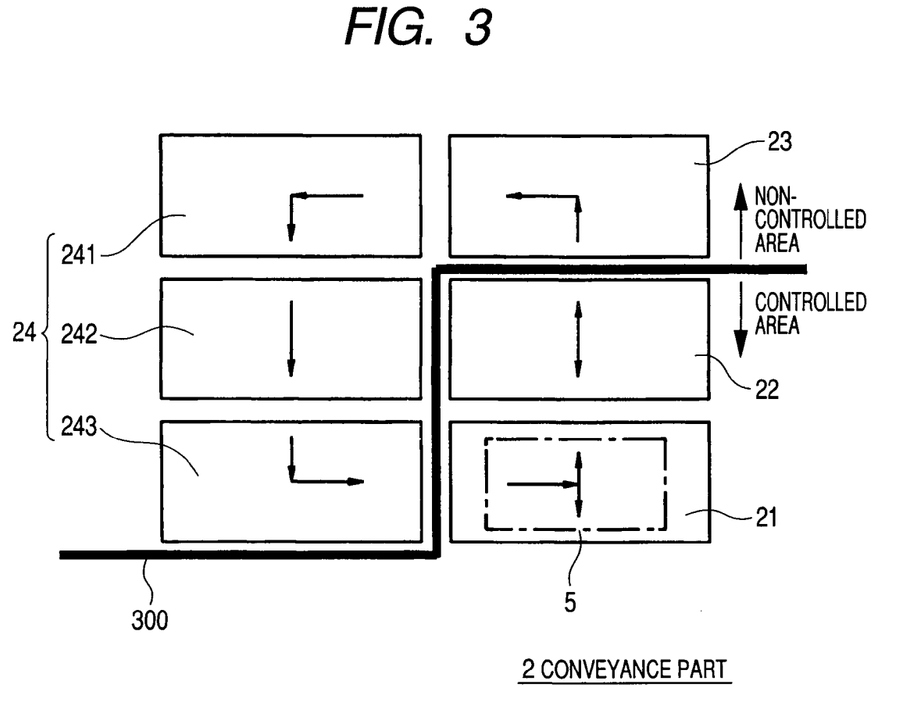
FIG. 3 is a view illustrating conveyance of the article carrying-out monitor according to the best mode for carrying out the invention.
Figure 4:
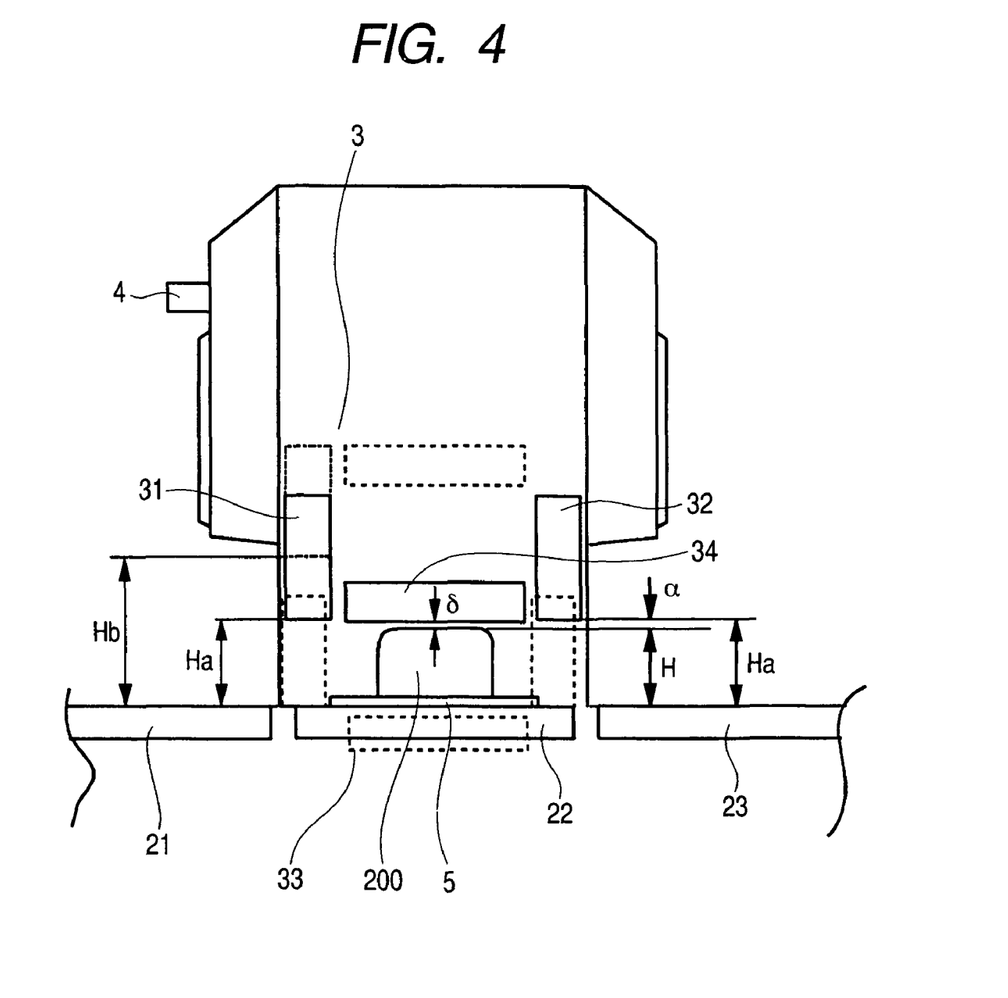
FIG. 4 is a view illustrating a monitor part as viewed from a side.

As shown in FIGS. 2 and 3, the conveyance part 2 comprises a carrying-in conveyor 21, a carrying conveyor 22, a carrying-out conveyor 23, and a return conveyor 24, each of which can be driven independently and which are arranged to circulate functionally. In addition, FIG. 2 is a view as viewed from a front face side (side of the controlled area) and FIG. 3 is a view as viewed from above. The return conveyor 24 further comprises a first conveyor 241, a second conveyor 242, and a third conveyor 243. The conveyance part 2 comprises a plurality of conveyor groups arranged annularly to pass through the monitor part 3 to make a circuit round an outer periphery thereof along a horizontal plane, and the tray 5, on which a small article is put, is caused by the conveyor groups to circulate.

Arrows on the respective conveyors indicate a direction of conveyance, arrows of forward and backward directions indicate reversible roller conveyors, and arrows of two right-angle directions indicate known, composite conveyors composed of a roller conveyor and a belt conveyor inserted between rollers to be capable of elevation.

The carrying-in conveyor 21 and the carrying conveyor 22 are made capable of forward and backward conveyance since when the small article 200 having been inspected is abnormal (contaminated), it should be returned to an original position on the side of the controlled area. The carrying-in conveyor 21, the carrying-out conveyor 23, and the first conveyor 241 and the third conveyor 243 out of the return conveyor 24 can be carried in two right-angle directions in order to circulate and carry the small article 200. The tray 5, on which the small article 200 is put, is square-shaped and can be put one by one on respective conveyors of the conveyor groups, the trays, the number of which is limited to five, being generally put dispersedly on the conveyor groups while being shown as being put only on the carrying-in conveyor 21 as indicated by alternate long and short dash lines in FIG. 3.

By the way, as shown in FIG. 3, the carrying-in conveyor 21 and the monitor part 3 (including the carrying conveyor 22) belong to the controlled area and the remaining conveyors belong to the non-controlled area, so that a partition 300 defining a partitioned wall indicated by a thick line being bent in a S-shaped configuration is provided as a boundary of the controlled area and the non-controlled area (depiction is omitted in FIG. 1). In addition, for reasons of a general arrangement, the return conveyor 24 is arranged on the right of the carrying-in conveyor 21 in some cases and the return conveyor 24 is made a unit of a carriage structure with casters so as to facilitate a change in arrangement (see FIG. 1).

As shown in FIG. 4, the monitor part 3 comprises an inlet door 31, an outlet door 32, a lower detection part 33, and an upper detection part 34. The monitor part 3 defines a space, of which six faces are shielded, forwardly and rearwardly of which are provided the inlet door 31 and the outlet door 32, on a lower side of which are provided the carrying conveyor 22 and the lower detection part 33, and on an upper side of which is provided the upper detection part 34, and on the left and right of which are provided shielding walls (not shown). Also, positioning is made so that both of a vertical distance between the lower detection part 33 and the small article 200 and a vertical distance between the small article 200 and the upper detection part 34 are made predetermined distances.

The inlet door 31 is formed by a structural system (not shown) to be capable of elevation. When the inlet door 31 opens, the small article 200 is carried into the monitor part 3. The outlet door 32 is also formed by a structural system (not shown) to be capable of elevation. When the outlet door 32 opens, the small article 200 is carried out into the non-controlled area outside the monitor part 3. Here, both the inlet door 31 and the outlet door 32 will not be opened, thus preventing leakage of contaminants to the non-controlled area from the controlled area.

The lower detection part 33 serves to measure surface contamination on the small article 200 and comprises, for example, a beta-ray plastic scintillation type detector. As described later, a multiplicity of lower split sensors (m, n) are arranged in a matrix manner.

The upper detection part 34 also serves to measure surface contamination on the small article 200 and comprises, for example, a beta-ray plastic scintillation type detector. As described later, a multiplicity of upper split sensors (m, n) are arranged in a matrix manner.

The lower detection part 33 and the upper detection part 34 enable measurement in six directions, that is, front and rear, left and right, and upper and lower directions, respectively, as viewed in a running direction. In addition, an explanation will be given below to measurement principle.

A vertical distance between the lower detection part 33 and the small article 200 provides for an optimum detection position in a level, in which the tray 5 is carried by the carrying conveyor 22 (see FIG. 6A or the like), and so the tray 5 and the carrying conveyor 22 constitute positioning means. A vertical distance between the small article 200 and the upper detection part 34 provides for positioning in a vertical direction so that the height sensor 4 measures a height of the small article 200 and a control driving part (not shown) drivingly controls an elevation means or mechanism (not shown) on the basis of measured data to put the upper detection part 34 in an optimum position, in which an appropriate sensitivity can be obtained, and so the height sensor 4, the control driving part, and the elevation mechanism constitute positioning means or mechanism. In addition, respective opening degrees of the inlet door 31 and the outlet door 32 and positioning of the upper detection part 34 will be described below when an operation is described.

The height sensor 4 comprises a sensor that measures a height of the small article 200, and for example, a laser range sensor.

At least an underside of the tray 5 is formed in a mesh like manner such that the small article 200 and the lower detection part 33 face each other with little shielding material therebetween.

An explanation will now be given to the operation of the article carrying-out monitor 100. First, a person who leaves puts a small article 200, such as tool, measuring instrument, document, notebook, etc., which is used in the controlled area, on the tray 5 being a dish-shaped container positioned in an input location on a front face, as shown in FIGS. 1 and 2. In FIG. 4, the inlet door 31 and the outlet door 32 of the monitor part 3 close in broken line positions in an initial stage and open in solid line positions when a person who leaves operates whereby the small article 200 put on the tray 5 passes through the inlet door 31. The upper detection part 34 stands by in a broken line position in an initial stage and descends to a solid line position at the time of measurement.

Respective opening degrees of the inlet door 31 and the outlet door 32 are determined to be made ($H+\alpha=H_a$), which is the sum of a height of the small article 200 and a necessary clearance, and positioning of an underside of the upper detection part 34 is determined so that a spacing between it and an upper surface of the small article 200 makes δ being appropriate for measurement. Here, when the small article 200 is in an input location, its height is beforehand measured by the height sensor 4 provided on an upper portion of a front face. In this manner, since respective opening degrees of the inlet door 31 and the outlet door 32 when the small article 200 passes therethrough are determined to amount to a necessity minimum, it is possible to achieve shortening of a period of time, during which the respective doors 31, 32 open and close, and hence a total inspection time (a period of time, during which the small article 200 is in the chamber of the monitor part 3). Also, inspection can be improved in accuracy by appropriately determining a vertical position of the upper detection part 34 at the time of inspection.

In addition, it is practical in some cases to fully open (indicated by an alternate long and short dash line) only the inlet door 31 to an opening degree $H_b$ irrespective of the height of the small article 200, instead of having its opening degree made to a necessity minimum as large as $H_a$. The reason for this is that even when the small article 200 as charged is in the course of being carried to the monitor part 3 together with the tray 5, a further, small article 200 having been failed to be put on the tray 5 can be additionally charged since the inlet door 31 is fully opened, and this is practically convenient in view of that situation, in which the small article 200 is frequently failed to be put on the tray 5.

The tray 5 is carried into the chamber of the monitor part 3 by the carrying-in conveyor 21 and the carrying conveyor 22, in which chamber the presence of contamination on front and rear, left and right, and upper and lower surfaces of the small article 200 is inspected (inspection principle will be described later). It is taken into consideration that the underside of the tray 5 is formed in a meshy manner as described above so that when being carried into the monitor part 3, the lower detection part 33 and the small article 200 face each other with no shielding material therebetween.

The small article 200 (indicated by an alternate long and short dash line in FIG. 1) as put is conveyed to the subsequent monitor part 3 to be subjected to inspection of contamination. When no contamination is present on the small article 200 as a result of inspection, the small article 200 together with the tray 5 is carried into the non-controlled area on a back surface side by the carrying conveyor 22 and the subsequent carrying-out conveyor 23 after the outlet door 32 is fully opened. A person who leaves receives the small article 200 as carried out after a further monitor finishes inspection of contamination on the person's body surface. The tray 5 having the small article 200 received to be made empty is automatically returned to an original input location by the conveyor groups.

While the small article 200 as carried out here stands by, in a state of being put on the tray 5, for receipt by a person who leaves, four trays 5 can stay on the carrying conveyor 22 and the return conveyor 24 so that subsequent inspection can be continued without interruption even when receipt is delayed for some reasons, for example, is delayed because of taking time for inspection of contamination on the person's body surface.

That tray 5, which reaches the third conveyor 243 positioned at a terminal end of the return conveyor 24 and still puts thereon the small article 200 having been inspected, is prevented from moving onto the carrying-in conveyor 21 but a tray having the small article 200 received to be made empty up to that time is moved onto the carrying-in conveyor 21 (returned to an original input location). The article carrying-out monitor 100 operates in the manner described above.

Figure 5:
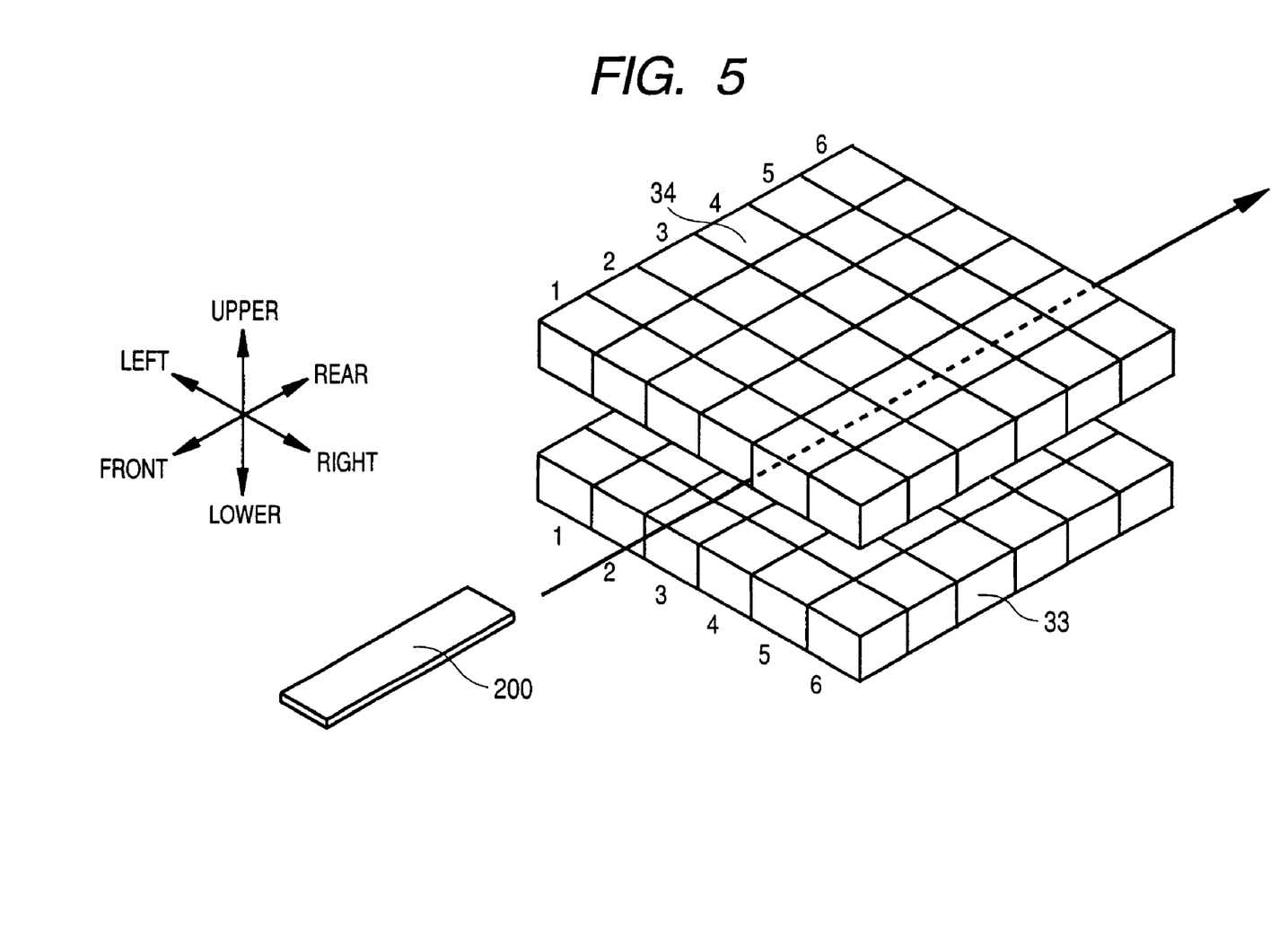
FIG. 5 is a view illustrating a lower detection part and an upper detection part.
Figure 6A:
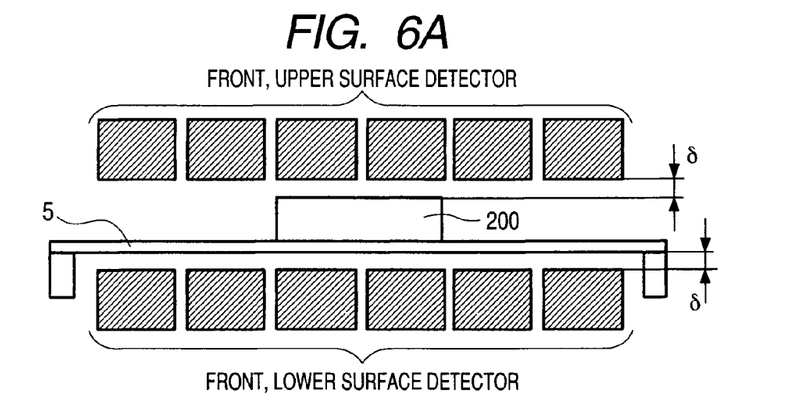
FIGS. 6A to 6C are views illustrating an interior of the monitor part, FIG. 6A being a front view, FIG. 6B being a right side view, and FIG. 6C being a side, cross sectional view.
Figure 6B:
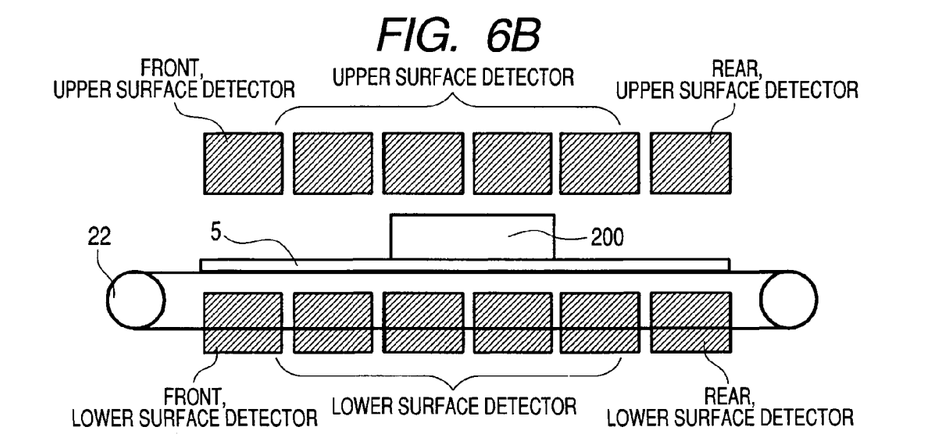
Figure 6C:
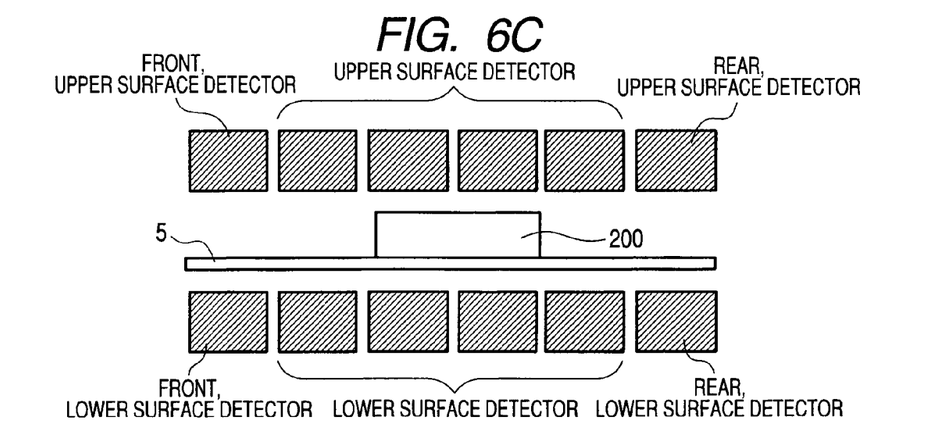
Figure 7A:
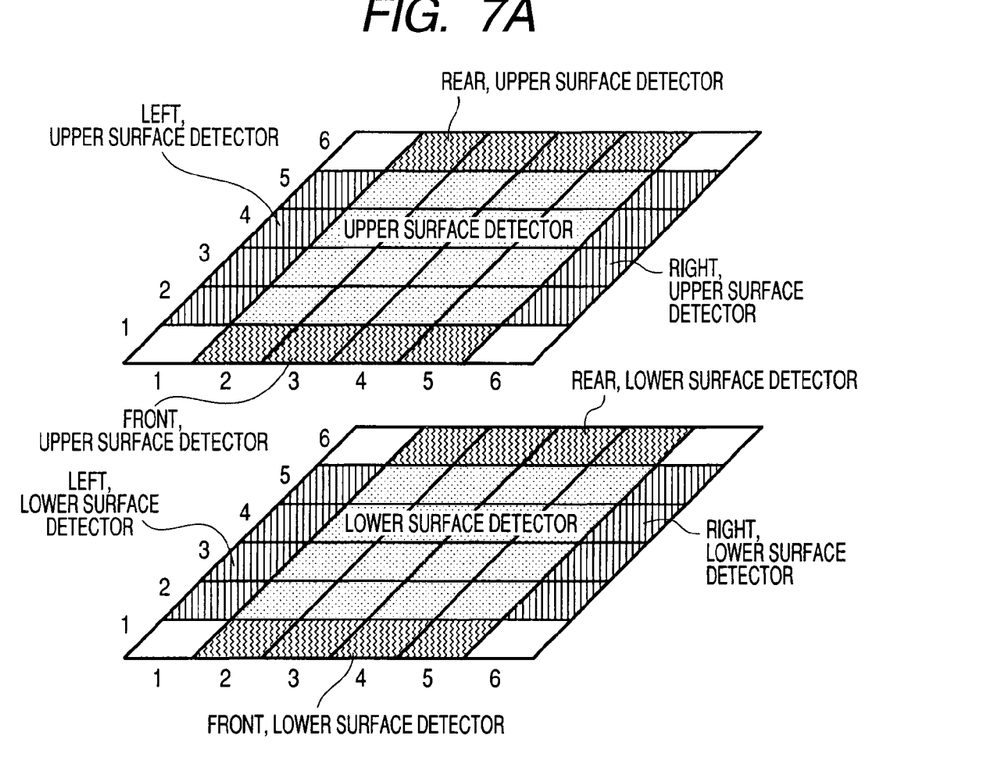
FIGS. 7A and 7B are views illustrating respective detectors, FIG. 7A being a view illustrating divided detectors of the lower detection part and the upper detection part, and FIG. 7B being a view illustrating division of divided sensors.
Figure 7B:
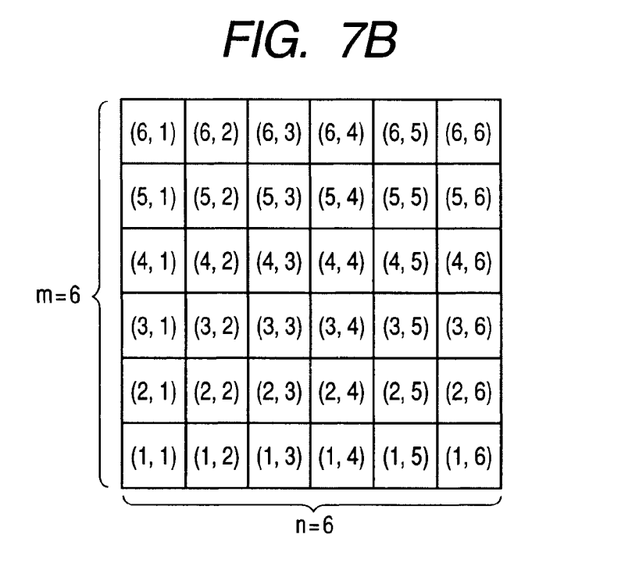
Figure 8A:
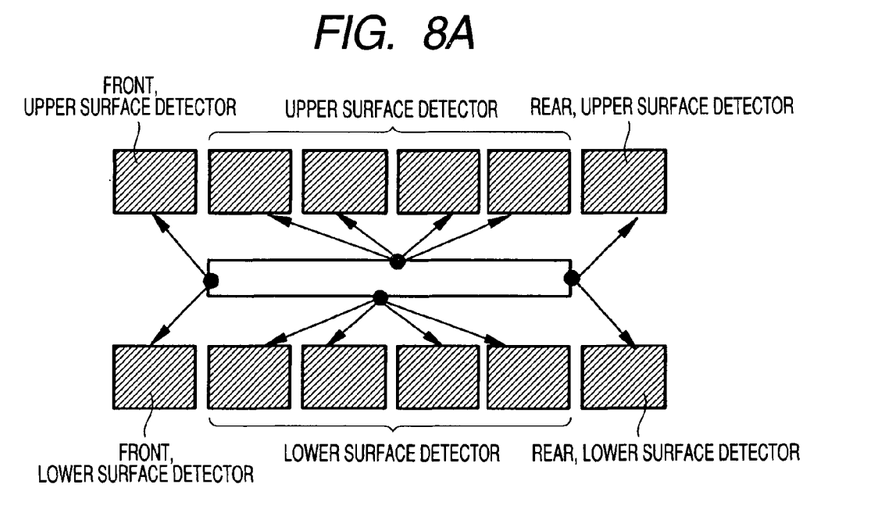
FIGS. 8A and 8B are views illustrating monitoring, FIG. 8A being a view illustrating monitoring of upper and lower, and front and rear surfaces, and FIG. 8B being a view illustrating monitoring of upper and lower, and left and right surfaces.
Figure 8B:
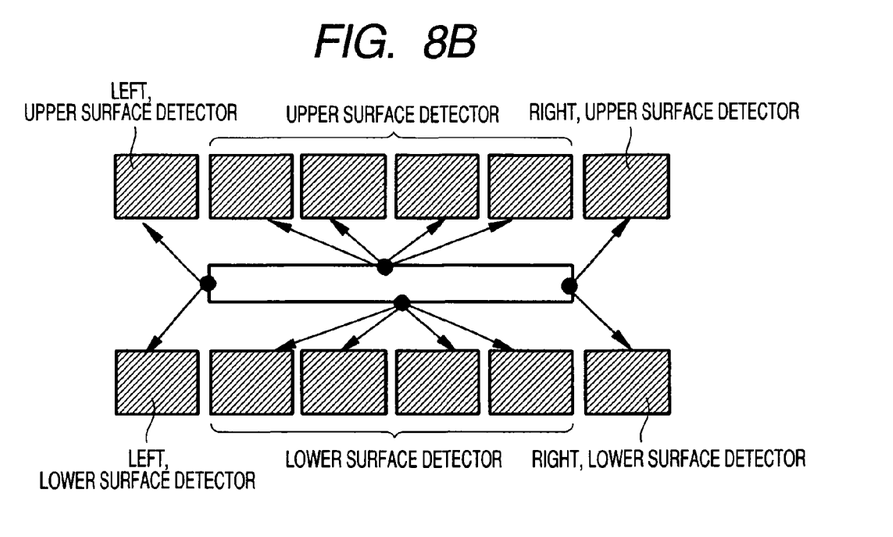

Subsequently, an explanation will be given to a detailed construction of and measurement principle of the lower detection part 33 and the upper detection part 34 of the monitor part 3. FIG. 5 is a view illustrating the lower detection part and the upper detection part. FIGS. 6A to 6C are views illustrating an interior of the monitor part, FIG. 6A being a front view, FIG. 6B being a right side view, and FIG. 6C being a side, cross sectional view. FIGS. 7A and 7B are views illustrating respective detectors, FIG. 7A being a view illustrating divided detectors of the lower detection part and the upper detection part, and FIG. 7B being a view illustrating division of divided sensors. FIGS. 8A and 8B are views illustrating monitoring, FIG. 8A being a view illustrating monitoring of upper and lower, and front and rear surfaces, and FIG. 8B being a view illustrating monitoring of upper and lower, and left and right surfaces.

As shown in FIG. 5, the detectors of the monitor part 3 broadly comprise the lower detection part 33 and the upper detection part 34. As shown in FIGS. 5 and 7B, the lower detection part 33 comprises a detector, in which lower divided sensors (6, 6) being 36 in total are arranged in a matrix configuration below a path of conveyance of the small article 200, which matrix comprises six columns in a direction substantially parallel to the path of conveyance and six rows in a direction substantially perpendicular to the path of conveyance. The lower divided sensors are connected to a control driving part (not shown), the control driving part using detection signals therefrom to perform a monitoring processing.

As shown in FIGS. 5 and 7B, the upper detection part 34 comprises a detector, in which upper divided sensors (6, 6) being 36 in total are arranged in a matrix configuration above the path of conveyance of the small article 200, which matrix comprises six columns in the direction substantially parallel to the path of conveyance and six rows in the direction substantially perpendicular to the path of conveyance. The upper divided sensors are connected to the control driving part, the control driving part using detection signals therefrom to perform a monitoring processing.

As shown in FIGS. 7A and 7B, among these detectors, the lower surface detector comprises lower divided sensors being 16 in total and arranged in a matrix configuration, which matrix comprises four columns in a direction substantially parallel to the path of conveyance of the small article 200 and four rows in a direction substantially perpendicular to the path of conveyance, the lower divided sensors comprising a lower divided sensor (2, 2), a lower divided sensor (2, 3), a lower divided sensor (2, 4), a lower divided sensor (2, 5), a lower divided sensor (3, 2), a lower divided sensor (3, 3), a lower divided sensor (3, 4), a lower divided sensor (3, 5), a lower divided sensor (4, 2), a lower divided sensor (4, 3), a lower divided sensor (4, 4), a lower divided sensor (4, 5), a lower divided sensor (5, 2), a lower divided sensor (5, 3), a lower divided sensor (5, 4), and a lower divided sensor (5, 5) (referred simply below to as the lower divided sensor (2, 2) to the lower divided sensor (5, 5)).

Also, as shown in FIGS. 7A and 7B, the upper surface detector comprises upper divided sensors being 16 in total and arranged in a matrix configuration, which matrix comprises four columns in a direction substantially parallel to the path of conveyance of the small article 200 and four rows in a direction substantially perpendicular to the path of conveyance, the upper divided sensors comprising an upper divided sensor (2, 2), an upper divided sensor (2, 3), an upper divided sensor (2, 4), an upper divided sensor (2, 5), an upper divided sensor (3, 2), an upper divided sensor (3, 3), an upper divided sensor (3, 4), an upper divided sensor (3, 5), an upper divided sensor (4, 2), an upper divided sensor (4, 3), an upper divided sensor (4, 4), an upper divided sensor (4, 5), an upper divided sensor (5, 2), an upper divided sensor (5, 3), an upper divided sensor (5, 4), and an upper divided sensor (5, 5) (referred simply below to as the upper divided sensor (2, 2) to the upper divided sensor (5, 5)).

As shown in FIGS. 7A and 7B, the front, lower surface detector comprises four lower divided sensors arranged in a direction substantially perpendicular to the path of conveyance of the small article 200, that is, a lower divided sensor (1, 2), a lower divided sensor (1, 3), a lower divided sensor (1, 4), and a lower divided sensor (1, 5) (referred simply below to as the lower divided sensor (1, 2) to the lower divided sensor (1, 4)).

As shown in FIGS. 7A and 7B, the front, upper surface detector comprises four upper divided sensors arranged in a direction substantially perpendicular to the path of conveyance of the small article 200, that is, an upper divided sensor (1, 2), an upper divided sensor (1, 3), an upper divided sensor (1, 4), and an upper divided sensor (1, 5) (referred simply below to as the upper divided sensor (1, 2) to the upper divided sensor (1, 4)).

As shown in FIGS. 7A and 7B, the rear, lower surface detector comprises four lower divided sensors arranged in a direction substantially perpendicular to the path of conveyance of the small article 200, that is, a lower divided sensor (6, 2), a lower divided sensor (6, 3), a lower divided sensor (6, 4), and a lower divided sensor (6, 5) (referred simply below to as the lower divided sensor (6, 2) to the lower divided sensor (6, 4)).

As shown in FIGS. 7A and 7B, the rear, upper surface detector comprises four upper divided sensors arranged in a direction substantially perpendicular to the path of conveyance of the small article 200, that is, an upper divided sensor (6, 2), an upper divided sensor (6, 3), an upper divided sensor (6, 4), and an upper divided sensor (6, 5) (referred simply below to as the upper divided sensor (6, 2) to the upper divided sensor (6, 4)).

As shown in FIGS. 7A and 7B, the left, lower surface detector comprises four lower divided sensors arranged in a direction substantially parallel to the path of conveyance of the small article 200, that is, a lower divided sensor (2, 1), a lower divided sensor (3, 1), a lower divided sensor (4, 1), and a lower divided sensor (5, 1) (referred simply below to as the lower divided sensor (2, 1) to the lower divided sensor (5, 1)).

As shown in FIGS. 7A and 7B, the left, upper surface detector comprises four upper divided sensors arranged in a direction substantially parallel to the path of conveyance of the small article 200, that is, an upper divided sensor (2, 1), an upper divided sensor (3, 1), an upper divided sensor (4, 1), and an upper divided sensor (5, 1) (referred simply below to as the upper divided sensor (2, 1) to the upper divided sensor (5, 1)).

As shown in FIGS. 7A and 7B, the right, lower surface detector comprises four lower divided sensors arranged in a direction substantially parallel to the path of conveyance of the small article 200, that is, a lower divided sensor (2, 6), a lower divided sensor (3, 6), a lower divided sensor (4, 6), and a lower divided sensor (5, 6) (referred simply below to as the lower divided sensor (2, 6) to the lower divided sensor (5, 6)).

As shown in FIGS. 7A and 7B, the right, upper surface detector comprises four upper divided sensors arranged in a direction substantially parallel to the path of conveyance of the small article 200, that is, an upper divided sensor (2, 6), an upper divided sensor (3, 6), an upper divided sensor (4, 6), and an upper divided sensor (5, 6) (referred simply below to as the upper divided sensor (2, 6) to the upper divided sensor (5, 6)).

The lower divided sensor (2, 2) to the lower divided sensor (5, 5) transmit 16 lower surface detection signals to the control driving part (not shown). The control driving part selects a lower surface detection signal, which has a large signal strength, among the signals to perform monitoring for determination of the presence of contamination on the lower surface of the small article 200. As shown in FIGS. 8A and 8B, detection can be surely made since radiation reaches the lower surface detector comprising the lower divided sensor (2, 2) to the lower divided sensor (5, 5) disposed on the lower surface.

Also, the upper divided sensor (2, 2) to the upper divided sensor (5, 5) transmit 16 upper surface detection signals to the control driving part. The control driving part selects an upper surface detection signal, which has a large signal strength, among the signals to perform monitoring for determination of the presence of contamination on the upper surface of the small article 200. As shown in FIGS. 8A and 8B, detection can be surely made since radiation reaches the upper surface detector comprising the upper divided sensor (2, 2) to the upper divided sensor (5, 5) disposed on the upper surface.

Also, the lower divided sensor (1, 2) to the lower divided sensor (1, 5) transmit four front, lower surface detection signals to the control driving part and the upper divided sensor (1, 2) to the upper divided sensor (1, 5) transmit four front, upper surface detection signals to the control driving part. The control driving part adds up the front, lower surface detection signals and the front, upper surface detection signals, which are opposed to each other, to perform monitoring for determination of the presence of contamination on the front surface of the small article 200. As shown in FIG. 8A, detection can be surely made since radiation reaches the front, lower surface detector comprising the lower divided sensor (1, 2) to the lower divided sensor (1, 5) disposed on the lower surface and the front, upper surface detector comprising the upper divided sensor (1, 2) to the upper divided sensor (1, 5) disposed on the upper surface.

Also, the lower divided sensor (6, 2) to the lower divided sensor (6, 5) transmit four rear, lower surface detection signals to the control driving part and the upper divided sensor (6, 2) to the upper divided sensor (6, 5) transmit four rear, upper surface detection signals to the control driving part. The control driving part adds up the rear, lower surface detection signals and the rear, upper surface detection signals, which are opposed to each other, to perform monitoring for determination of the presence of contamination on the rear surface of the small article 200. As shown in FIG. 8A, detection can be surely made since radiation reaches the rear, lower surface detector comprising the lower divided sensor (6, 2) to the lower divided sensor (6, 5) disposed on the lower surface and the rear, upper surface detector comprising the upper divided sensor (6, 2) to the upper divided sensor (6, 5) disposed on the upper surface.

Also, the lower divided sensor (2, 1) to the lower divided sensor (5, 1) transmit four left, lower surface detection signals to the control driving part and the upper divided sensor (2, 1) to the upper divided sensor (5, 1) receive four left, upper surface detection signals to transmit the same to the control driving part. The control driving part adds up the left, lower surface detection signals and the left, upper surface detection signals, which are opposed to each other, to perform monitoring for determination of the presence of contamination on the left surface of the small article 200. As shown in FIG. 8B, detection can be surely made since radiation reaches the left, lower surface detector comprising the lower divided sensor (2, 1) to the lower divided sensor (5, 1) disposed on the lower surface and the left, upper surface detector comprising the upper divided sensor (2, 1) to the upper divided sensor (5, 1) disposed on the upper surface.

Also, four right, lower surface detection signals from the lower divided sensor (2, 6) to the lower divided sensor (5, 6) are transmitted to the control driving part and four right, upper surface detection signals from the upper divided sensor (2, 6) to the upper divided sensor (5, 6) are transmitted to the control driving part. The control driving part adds up the right, lower surface detection signals and the right, upper surface detection signals, which are opposed to each other, to perform monitoring for determination of the presence of contamination on the right surface of the small article 200. As shown in FIG. 8B, detection can be surely made since radiation reaches the right, lower surface detector comprising the lower divided sensor (2, 6) to the lower divided sensor (5, 6) disposed on the lower surface and the right, upper surface detector comprising the upper divided sensor (2, 6) to the upper divided sensor (5, 6) disposed on the upper surface.

In addition, while the embodiment has been described as comprising, as an example of the upper detection part and the lower detection part, lower divided sensors and upper divided sensors, which is 6×6 in number in order to give a specific explanation, the number is m×n in generalization.

An explanation will now be given also to the case of generalization. As shown in FIG. 5, the detectors of the monitor part 3 broadly comprise the lower detection part 33 and the upper detection part 34. The lower detection part 33 comprises lower divided sensors (i, j) arranged in a matrix configuration below the path of conveyance of the small article 200, which matrix comprises i (i=1 to m) columns in a direction substantially parallel to the path of conveyance and j (j=1 to n) rows in a direction substantially perpendicular to the path of conveyance. The upper detection part 34 comprises upper divided sensors (i, j) arranged in a matrix configuration above the path of conveyance of the small article 200, which matrix comprises i (i=1 to m) columns in a direction substantially parallel to the path of conveyance and j (j=1 to n) rows in a direction substantially perpendicular to the path of conveyance.

The lower surface detector comprises lower divided sensors (i, j) being (m−2)×(n−2) in number with i=2 to (m−1) and j=2 to (n−1) to output lower surface detection signals being (m−2)×(n−2) in number.

The upper surface detector comprises upper divided sensors (i, j) being (m−2)×(n−2) in number with i=2 to (m−1) and j=2 to (n−1) to output upper surface detection signals being (m−2)×(n−2) in number.

The front, lower surface detector comprises lower divided sensors (i, j) being (n−2) in number with i=1 and j=2 to (n−1) to output front, lower surface detection signals being (n−2) in number.

The front, upper surface detector comprises upper divided sensors (i, j) being (n−2) in number with i=1 and j=2 to (n−1) to output front, upper surface detection signals being (n−2) in number.

The rear, lower surface detector comprises lower divided sensors (i, j) being (n−2) in number with i=m and j=2 to (n−1) to output rear, lower surface detection signals being (n−2) in number.

The rear, upper surface detector comprises upper divided sensors (i, j) being (n−2) in number with i=m and j=2 to (n−1) to output rear, upper surface detection signals being (n−2) in number.

The left, lower surface detector comprises lower divided sensors (i, j) being (m−2) in number with i=2 to (m−1) and j=1 to output left, lower surface detection signals being (m−2) in number.

The left, upper surface detector comprises upper divided sensors (i, j) being (m−2) in number with i=2 to (m−1) and j=1 to output left, upper surface detection signals being (m−2) in number.

The right, lower surface detector comprises lower divided sensors (i, j) being (m−2) in number with i=2 to (m−1) and j=n to output right, lower surface detection signals being (m−2) in number.

The right, upper surface detector comprises upper divided sensors (i, j) being (m−2) in number with i=2 to (m−1) and j=n to output right, upper surface detection signals being (m−2) in number.

The lower divided sensor (2, 2) to the lower divided sensor (m−1, n−1) transmit lower surface detection signals, which are (m−2)×(n−2) in number and obtained as a result of detection of radiation, to the control driving part.

The control driving part selects a lower surface detection signal, which has a large signal strength, among the signals to perform monitoring for determination of the presence of contamination on the lower surface of the small article 200. Detection can be surely made since radiation reaches the lower surface detector comprising the lower divided sensor (2, 2) to the lower divided sensor (m−1, n−1) disposed on the lower surface.

The upper divided sensor (2, 2) to the upper divided sensor (m−1, n−1) transmit upper surface detection signals, which are (m−2)×(n−2) in number and obtained as a result of detection of radiation, to the control driving part. The control driving part selects an upper surface detection signal, which has a large signal strength, among the signals to perform monitoring for determination of the presence of contamination on the upper surface of the small article 200. Detection can be surely made since radiation reaches the upper surface detector comprising the upper divided sensor (2, 2) to the upper divided sensor (m−1, n−1) disposed on the upper surface.

The lower divided sensor (1, 2) to the lower divided sensor (1, n−1) transmit front, lower surface detection signals, which are (n−2) in number and are obtained as a result of detection of radiation, to the control driving part and the upper divided sensor (1, 2) to the upper divided sensor (1, n−1) transmit front, upper surface detection signals, which are (n−2) in number and are obtained as a result of detection of radiation, to the control driving part. The control driving part adds up the front, lower surface detection signals and the front, upper surface detection signals, which are opposed to each other, to perform monitoring for determination of the presence of contamination on the front surface of the small article 200. Detection can be surely made since radiation reaches the front, lower surface detector comprising the lower divided sensor (1, 2) to the lower divided sensor (1, n−1) disposed on the lower surface and the front, upper surface detector comprising the upper divided sensor (1, 2) to the upper divided sensor (1, n−1) disposed on the upper surface.

The lower divided sensor (m, 2) to the lower divided sensor (m, n−1) transmit four rear, lower surface detection signals, which are obtained as a result of detection of radiation, to the control driving part and the upper divided sensor (m, 2) to the upper divided sensor (m, n−1) transmit four rear, upper surface detection signals, which are obtained as a result of detection of radiation, to the control driving part. The control driving part adds up the rear, lower surface detection signals and the rear, upper surface detection signals, which are opposed to each other, to perform monitoring for determination of the presence of contamination on the rear surface of the small article 200. Detection can be surely made since radiation reaches the rear, lower surface detector comprising the lower divided sensor (m, 2) to the lower divided sensor (m, n−1) disposed on the lower surface and the rear, upper surface detector comprising the upper divided sensor (m, 2) to the upper divided sensor (m, n−1) disposed on the upper surface.

Also, the lower divided sensor (2, 1) to the lower divided sensor (m−1, 1) transmit four left, lower surface detection signals, which are obtained as a result of detection of radiation, to the control driving part and the upper divided sensor (2, 1) to the upper divided sensor (m−1, 1) transmit four left, upper surface detection signals, which are obtained as a result of detection of radiation, to the control driving part. The control driving part adds up the left, lower surface detection signals and the left, upper surface detection signals, which are opposed to each other, to perform monitoring for determination of the presence of contamination on the left surface of the small article 200. Detection can be surely made since radiation reaches the left, lower surface detector comprising the lower divided sensor (2, 1) to the lower divided sensor (m−1, 1) disposed on the lower surface and the left, upper surface detector comprising the upper divided sensor (2, 1) to the upper divided sensor (m−1, 1) disposed on the upper surface.

The lower divided sensor (2, n) to the lower divided sensor (m−1, n) transmit four right, lower surface detection signals, which are obtained as a result of detection of radiation, to the control driving part and the upper divided sensor (2, n) to the upper divided sensor (m−1, n) transmit four right, upper surface detection signals, which are obtained as a result of detection of radiation, to the control driving part. The control driving part adds up the right, lower surface detection signals and the right, upper surface detection signals, which are opposed to each other, to perform monitoring for determination of the presence of contamination on the right surface of the small article 200. Detection can be surely made since radiation reaches the right, lower surface detector comprising the lower divided sensor (2, n) to the lower divided sensor (m−1, n) disposed on the lower surface and the right, upper surface detector comprising the upper divided sensor (2, n) to the upper divided sensor (m−1, n) disposed on the upper surface. The monitor part 3 as generalized performs monitoring in this manner.

In this manner, the article carrying-out monitor 100 of the invention is made of a system, in which a multiplicity of divided sensors are arranged in upper and lower/front and rear/left and right/left sides and signals from the divided sensors are combined to contrive a signal processing to make measurements most efficiently according to a small article. Since the detectors are capable of detecting front and rear, and left and right sides of a small article are arranged on upper and lower sides, it suffices to provide an upper detection part and a lower detection part to increase the freedom in design. When the upper detection part and the lower detection part are caused to approach optimum positions, detectors for detection of front and rear, and left and right surfaces of a small article approach the front and rear, and left and right surfaces of the small article to enable detecting even a weak radiation on six, that is, front and rear, left and right, and upper and lower surfaces. Reduction in influences by background noise are realized by decreasing detection areas of lower surface divided sensors and upper surface divided sensors to reduce detection of background noise and selecting only a detection signal, which has a high signal strength.

Figure 9A:
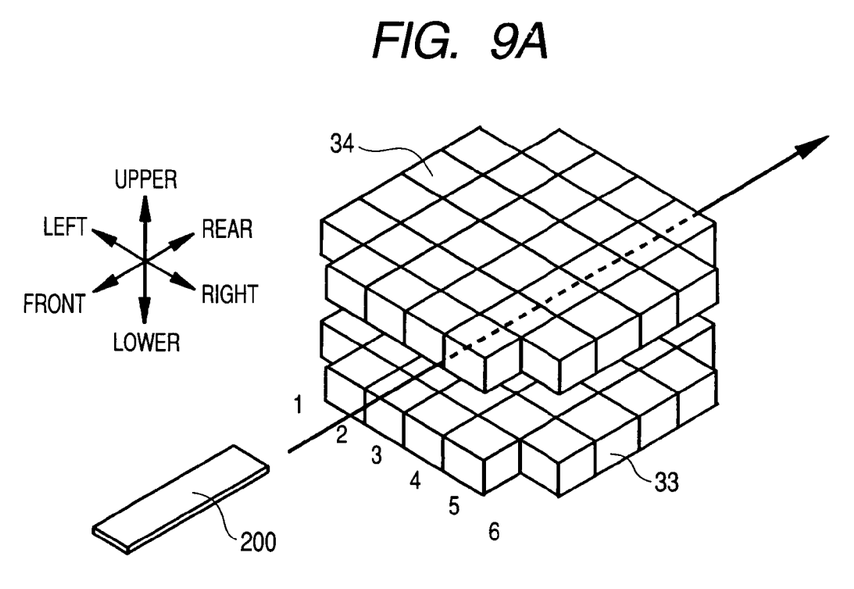
FIGS. 9A and 9B are views illustrating a monitor part of a further mode, FIG. 9A being a view illustrating a lower detection part and an upper detection part, and FIG. 9B being a view illustrating division of divided sensors.
Figure 9B:
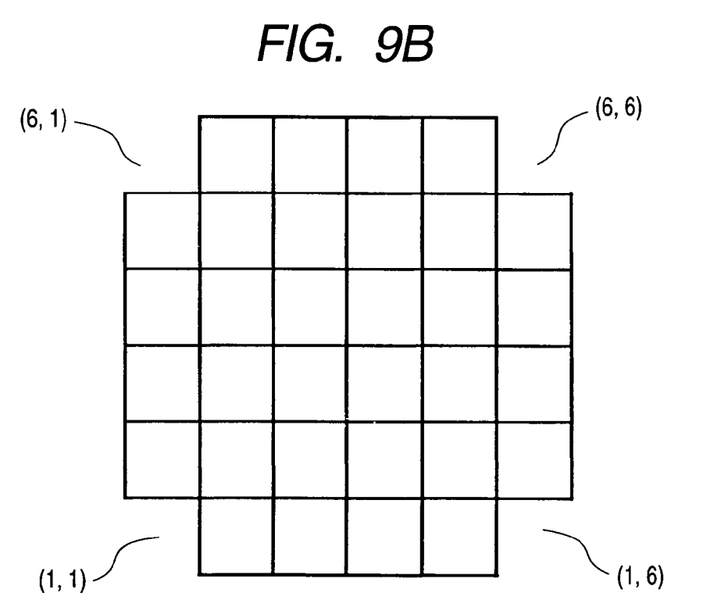

Subsequently, other embodiments will be described with reference to the drawings. FIGS. 9A and 9B are views illustrating a monitor part of a further mode, FIG. 9A being a view illustrating a lower detection part and an upper detection part, and FIG. 9B being a view illustrating division of divided sensors.

In this embodiment, the lower detection part 33 illustrated in FIG. 7A is not formed with the lower divided sensor (1, 1), the lower divided sensor (1, 6), the lower divided sensor (6, 1), and the lower divided sensor (6, 6), and likewise the upper detection part 34 is not formed with the upper divided sensor (1, 1), the upper divided sensor (1, 6), the upper divided sensor (6, 1), and the upper divided sensor (6, 6). In generalization, the lower detection part 33 is not formed with the lower divided sensor (1, 1), the lower divided sensor (1, n), the lower divided sensor (m, 1), and the lower divided sensor (m, n), and likewise the upper detection part 34 is not formed with the upper divided sensor (1, 1), the upper divided sensor (1, n), the upper divided sensor (m, 1), and the upper divided sensor (m, n). In other words, the sensors on the four corners of the array are deleted. With such construction, it is possible to embody another version of the invention. Design can be increased in freedom since it is possible to ensure a space for arrangement of positioning mechanism, in the location.

In addition, the article carrying-out monitor 100 is susceptible to various modifications. For example, the height sensor 4 shown in FIGS. 1 and 4 may be removed and other positioning mechanism may be adopted. For example, a vertical distance between the lower detection part 33 and the small article 200 provides for an optimum detection position in a level, in which the tray 5 is carried by the carrying conveyor 22 (see FIG. 6A), and so the tray 5 and the carrying conveyor 22 constitute a positioning mechanism. A vertical distance between the small article 200 and the upper detection part 34 may provide for positioning in a vertical direction so that an upper tray (not shown) is first caused to descend from above the small article 200, a reaction force generated at the time of contact with the small article 200 is detected to stop the upper tray (not shown), a control driving part (not shown) drivingly controls an elevation means or mechanism (not shown) so that the upper detection part 34 is put in a position by a predetermined distance above a position of the upper tray (not shown) to be optimally positioned to enable assuming an appropriate sensitivity, and so the upper tray (not shown), the control driving part, and the elevation mechanism constitute a positioning means or mechanism. Such positioning means will do. When the upper tray (not shown) is provided with a wire mesh like the tray 5 on a lower side, upper and lower surfaces are made the same in conditions of measurement.

Also, while the conveyance part 2 has been described citing, as an example, a circulating type shown in FIGS. 2 and 3, for example, a one-way conveyance part provided with no return conveyor can also be employed.

The invention has been described with reference to certain preferred embodiments thereof. It will be understood, however, that modifications and variations are possible within the scope of the appended claims.

What is claimed is:
1. An article carrying-out monitor comprising:
a monitor part including a radiation detector to monitor an article to be inspected;
a carrying-in conveyor that carries a tray, on which an article to be inspected is put, into the monitor part;
a carrying conveyor that conveys the tray in the monitor part; and a carrying-out conveyor that carries a tray, on which an article to be inspected is put, from the monitor part in order to inspect the presence of contamination, by radioactive substances, on an article to be inspected carried out from a controlled area of a facility, in which radioactive substances are handled;

wherein the detector in the monitor part includes a lower surface detector disposed below a path of conveyance of an article to be inspected, an upper surface detector disposed above the path of conveyance of an article to be inspected, a front, lower surface detector disposed forwardly of the lower surface detector, a front, upper surface detector disposed forwardly of the upper surface detector, a rear, lower surface detector disposed rearwardly of the lower surface detector, a rear, upper surface detector disposed rearwardly of the upper surface detector, a left, lower surface detector disposed leftward of the lower surface detector, a left, upper surface detector disposed leftward of the upper surface detector, a right, lower surface detector disposed rightward of the lower surface detector, and a right, upper surface detector disposed rightward of the upper surface detector; and wherein the monitor part detects the presence of contamination on a lower surface of an article to be inspected on the basis of a lower surface detection signal from the lower surface detector, detects the presence of contamination on an upper surface of an article to be inspected on the basis of an upper surface detection signal from the upper surface detector, detects the presence of contamination on a front surface of an article to be inspected on the basis of a front, lower surface detection signal from the front, lower surface detector and a front, upper surface detection signal from the front, upper surface detector, detects the presence of contamination on a rear surface of an article to be inspected on the basis of a rear, lower surface detection signal from the rear, lower surface detector and a rear, upper surface detection signal from the rear, upper surface detector, detects the presence of contamination on a left surface of an article to be inspected on the basis of a left, lower surface detection signal from the left, lower surface detector and a left, upper surface detection signal from the left, upper surface detector, and detects the presence of contamination on a right surface of an article to be inspected on the basis of a right, lower surface detection signal from the right, lower surface detector and a right, upper surface detection signal from the right, upper surface detector to perform monitoring.

2. The article carrying-out monitor according to claim 1, wherein the detector in the monitor part comprises:

a lower detection part comprising lower divided sensors (i, j) arranged in a matrix configuration below a path of conveyance of an article to be inspected, which matrix comprises i (i=1 to m) columns in a direction substantially parallel to the path of conveyance and j (j=1 to n) rows in a direction substantially perpendicular to the path of conveyance; and an upper detection part including upper divided sensors (i, j) arranged in a matrix configuration above the path of conveyance of an article to be inspected, which matrix comprises i (i=1 to m) columns in a direction substantially parallel to the path of conveyance and j (j=1 to n) rows in a direction substantially perpendicular to the path of conveyance;

wherein the monitor part performs monitoring for determination of the presence of contamination on an article to be inspected, selecting a detection signal, which has a large signal strength, among:

lower surface detection signals being (m−2)×(n−2) in number and output from the lower surface detector, which comprises lower divided sensors (i, j) being (m−2)×(n−2) in number with i=2 to (m−1) and j=2 to (n−1); upper surface detection signals being (m−2)×(n−2) in number and output from the upper surface detector, which comprises upper divided sensors (i, j) being (m−2)×(n−2) in number with i=2 to (m−1) and j=2 to (n−1);

front, lower surface detection signals being (n−2) in number and output from the front, lower surface detector, which comprises lower divided sensors (i, j) being (n−2) in number with i=1 and j=2 to (n−1);

front, upper surface detection signals being (n−2) in number and output from the front, upper surface detector, which comprises upper divided sensors (i, j) being (n−2) in number with i=1 and j=2 to (n−1);

rear, lower surface detection signals being (n−2) in number and output from the rear, lower surface detector, which comprises lower divided sensors (i, j) being (n−2) in number with i=m and j=2 to (n−1);

rear, upper surface detection signals being (n−2) in number and output from the rear, upper surface detector, which comprises upper divided sensors (i, j) being (n−2) in number with i=m and j=2 to (n−1);

left, lower surface detection signals being (m−2) in number and output from the left, lower surface detector, which comprises lower divided sensors (i, j) being (m−2) in number with i=2 to (m−1) and j=1;

left, upper surface detection signals being (m−2) in number and output from the left, upper surface detector, which comprises upper divided sensors (i, j) being (m−2) in number with i=2 to (m−1) and j=1;

right, lower surface detection signals being (m−2) in number and output from the right, lower surface detector, which comprises lower divided sensors (i, j) being (m−2) in number with i=2 to (m−1) and j=n; and right, upper surface detection signals being (m−2) in number and output from the right, upper surface detector, which comprises upper divided sensors (i, j) being (m−2) in number with i=2 to (m−1) and j=n.

3. The article carrying-out monitor according to claim 2, wherein the lower detection part is not formed with the lower divided sensor (1, 1), the lower divided sensor (m, 1), the lower divided sensor (1, n), and the lower divided sensor (m, n), and wherein the upper detection part is not formed with the upper divided sensor (1, 1), the upper divided sensor (m, 1), the upper divided sensor (1, n), and the upper divided sensor (m, n) to provide spaces at four corners of the monitor part.

4. The article carrying-out monitor according to claim 2, further comprising a positioning device that makes both a vertical distance between the lower detection part and an article to be inspected and a vertical distance between an article to be inspected the upper detection part predetermined distances.

5. The article carrying-out monitor according to claim 3, further comprising a positioning mechanism that makes both a vertical distance between the lower detection part and an article to be inspected and a vertical distance between an article to be inspected the upper detection part predetermined distances.

* * * * *